Aug. 15, 1939.   F. R. MURPHY   2,169,275
FLAKER
Filed March 27, 1937   3 Sheets-Sheet 2

Frank R. Murphy
Inventor
Delos G. Haynes
Attorney

Aug. 15, 1939.  F. R. MURPHY  2,169,275
FLAKER
Filed March 27, 1937  3 Sheets-Sheet 3

Frank R. Murphy
Inventor
Delos G. Haynes
Attorney

Patented Aug. 15, 1939

2,169,275

UNITED STATES PATENT OFFICE 2,169,275

FLAKER

Frank R. Murphy, Mount Vernon, Ill., assignor to J. P. Devine Manufacturing Co., Inc., Mount Vernon, Ill., a corporation of Illinois Application March 27, 1937, Serial No. 133,474

6 Claims. (Cl. 257—98)

This invention relates to flakers, and with regard to certain more specific features, to improvements in drum types of flakers for producing a greater yield and a more desirable flake.

Among the several objects of the invention may be noted the provision of an improved form of feed for drum flakers; the provision of apparatus of the class described in which the amount of flaked material obtained may be multiplied without commensurately multiplying the units of apparatus used; and the provision of a method and apparatus of the class described which will produce a thicker flake for a given material than has been heretofore possible. Other objects will be in part obvious and in part pointed out hereinafter.

The invention accordingly comprises the elements and combinations of elements, steps and sequence of steps, features of construction, and arrangements of parts, which will be exemplified in the structures, products, and processes hereinafter described, and the scope of the application of which will be indicated in the following claims.

In the accompanying drawings, in which are illustrated one or more of various possible embodiments of the invention, Fig. 1 is a front elevation, parts being broken away at the left to show a section;

Similar reference characters indicate corresponding parts throughout the several views of the drawings.

Figure 1:
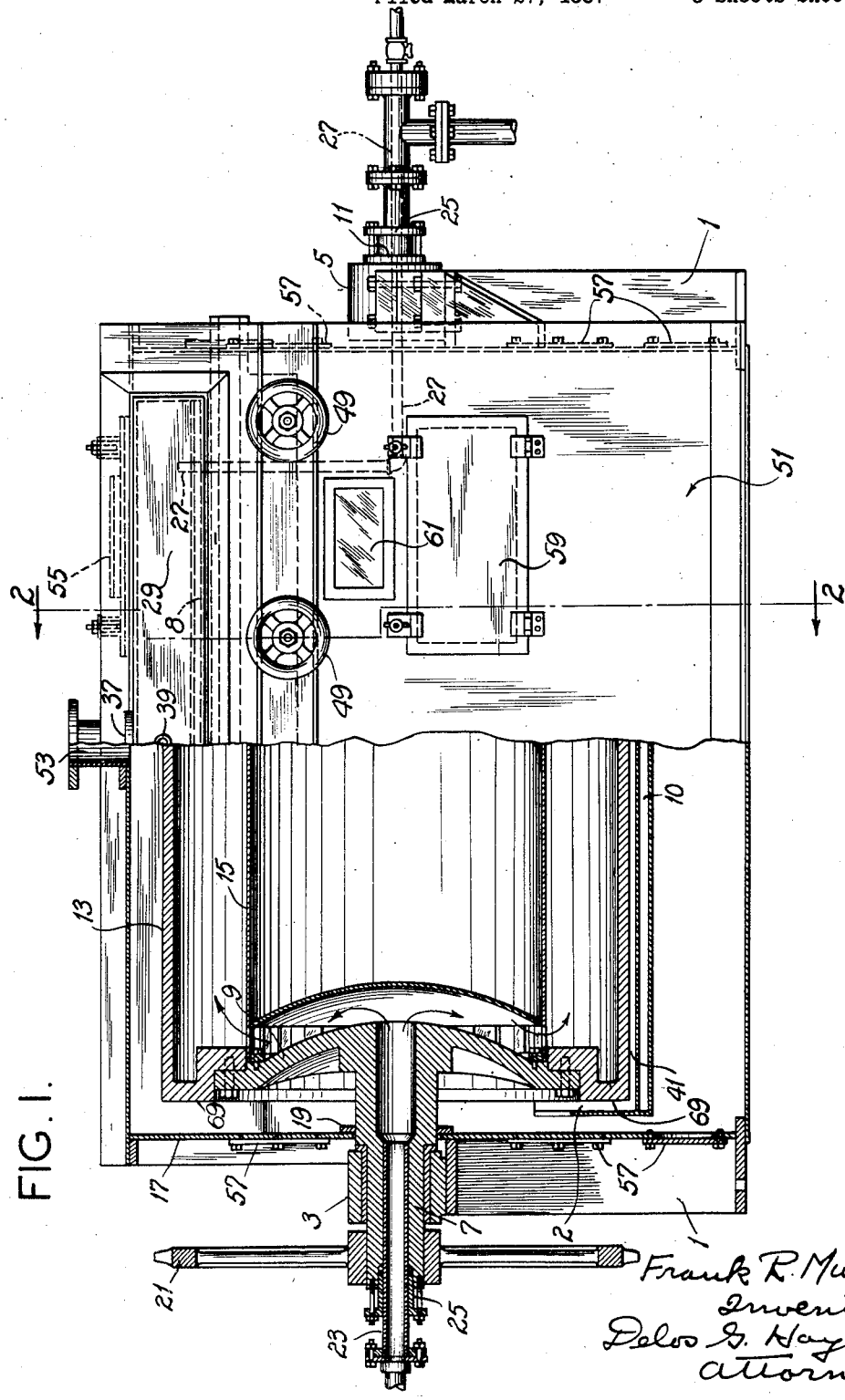

Flaker machines are, in general, used throughout the chemical and allied industries for the purpose of producing flakes from materials which are solids under atmospheric temperature and pressure conditions. These flakes are of varying thicknesses and dimensions. Materials such as sodium sulphide, in the unflaked form, are usually furnished to the market in bags, drums or in bulk. In filling drums with such material, heat is first applied to the material until it has melted down and the resulting liquor is poured into the drums and allowed to solidify. It then becomes necessary to break open the drums with axes, or otherwise, to remove the solid material. Such materials shipped in bags are in the form of lumps, large and small, and varying in size from dust or "fines" to lumps ten or twelve inches in diameter. All materials handled in this manner require considerable time to melt down due to the large lumps, and represent a dust nuisance and loss from this source.

It has been found convenient, practical, and profitable to melt down such solids and to apply the hot liquor to the surface of a cooled revolving drum or cylinder through which the latent heat of fusion is extracted. Thus the material is frozen or solidified upon the surface of the revolving drum in the form of a film. The film of frozen or solidified material is removed from the surface of the drum by a knife which is set to scrape the surface, and the material chips off the surface in flakes of thicknesses up to one quarter or so inches, and in other dimensions up to and including twelve and fifteen inches across the widest point. The resulting thicknesses and other dimensions of the flakes will depend upon the material and such conditions of operation as, peripheral speed of the drum; quantity and temperature of cooling water; and method of applying the hot liquor to the surface of the drum.

The said flaked materials are usually shipped in sizes varying from one-half inch to two inches, across the widest section, and material in this form is almost free from dust, and can be melted down comparatively easily. In the market it is preferred that the materials be furnished in flakes having a thickness of three sixteenths or one quarter inches, but actual operation upon certain materials and with sodium sulphide as an example, indicates that no method of feeding yet known will cause a film of such thickness to adhere to the drum surface. For most materials, reducing the speed of the drum tends to increase the flake thickness, since it allows any one point of the drum surface to be in contact with the hot liquor for a longer period of time. Increasing the flow of cooling water, or other cooling medium, through the center of the drum, also produces the same effect. Increasing the depth of submergence of the drum in dipping it into the liquid also has the same effect.

In the case of sodium sulphide, the maximum flake thickness that can be produced with a drum speed of only 0.237 R. P. M., and with other conditions most suitable, is approximately one-eighth inch. Certain other materials are similar in reference to the small flake thickness that it is ordinarily possible to obtain. The present invention, among other things, teaches how to increase this thickness.

Referring now more particularly to Fig. 1, there are shown at numerals 1 supports for bearings 3 and 5. The bearing 3 rotatably supports a hollow journal 7 which interiorly is formed as a head 9. A similar journal 11 through the bearings 5 carries a similar head.

Between the heads is supported a cooling drum 13 within which is a baffle drum 15. A casing 17 surrounds the drum and is packed at the journals as shown at 19.

On the journal 7 is a driving sprocket 21 for driving the journals and said drums 13 and 15. A water inlet pipe 23 is adapted to supply water interiorly of the drum 13, said pipe passing through a packing gland 25. An outlet water pipe 27 passes from a similar packing gland 25 in the journal 11 at the other end of the apparatus.

From the above it will be seen that while cold water is introduced at the pipe 23, and through the drum 13 to the outlet 27, said drum 13 may be rotated by means of said sprocket wheel 21. The purpose of the baffle drum 15 is to maintain the water in the drum 13 in a state of agitation and near the drum 15 for maximum absorption of heat.

Figure 2:
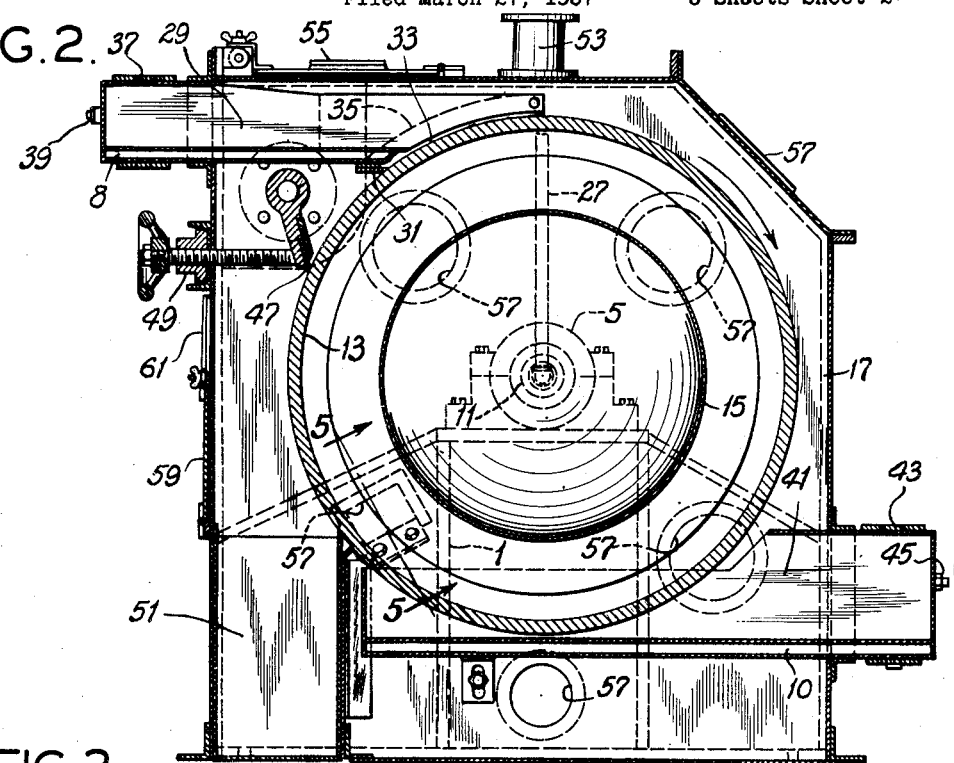
Fig. 2 is a vertical section taken on line 2—2 of Fig. 1.

Referring to Fig. 2, there is shown at numeral 29 a weir type of liquor pan, the bottom of which is sealed along the drum 13 by means of a flexible seal 31. The sides of the pan are arcuately formed peripherally of the drum as shown at numeral 33 and provided with an arcuate seal 35. The seals 31 and 35 may be composed of any of the known materials for the purpose, such as wood or a suitable composition. A liquor inlet 37 is provided and an overflow 39 for maintaining a head of liquor in said weir pan 29. A heating jacket is shown at numeral 8. As indicated, the drum turns clockwise in Fig. 2, that is, away from the weir pan 29.

On the lower side of the drum 13 is a dip-feed type of pan 41 having a liquor inlet 43 and an overflow outlet 45 for carrying a head of liquor. A heating jacket is shown at numeral 16. The relative elevation of the drum 13 and of the pan 41 is such that the lower surface of the drum is submerged in said liquor.

An adjustable scraper blade 47 is adapted to be lightly thrust into contact with said drum 13 by means of screw mechanisms 49.

The operation of the apparatus shown in Figs. 1 and 2 is as follows:

Rotation of the drum 13 in a clockwise direction (Fig. 2) causes a film of liquor to be deposited thereon as the drum rolls past the end of the weir pan 29. As this film is applied, it has the heat abstracted therefrom by the cold water circulating through said drum 13 and therefore freezes or solidifies on the drum. The frozen layer revolves around with the drum 13 and by the time that the dip pan 41 is reached the layer is solid and cold. This cold film is then submerged in the dip pan where another film of hot liquor is taken up and added. The drum 13 emerges from the dip pan 41 with a double or thicker film thereon which promptly freezes throughout and which finally reaches the scraper or knife 47 as a double thickness of coalesced material. As the knife is reached, the layer is flaked off and dropped into an exit box 51.

Accessories consist of a fume outlet 53, upper access doors 55 in the casing 17; inspection openings 57 at suitable points; also access doors 59 and an observation window 61 provided in the front of the apparatus.

It will be seen from the above that this method and apparatus not only increase the thickness of the resulting flakes but also increase the capacity of the drum 13 in the weight of flake material produced, since the drum has the ability to effect additional heat transfer at a rate which is approximately double that of the same drum operating with a single feed pan. It will be seen that by suitable arrangement, more layers may be deposited and flaked off than two. It should also be understood that other methods of feeding may be used for either or both of the pans 29 and 41, such as for example spray feeds.

It will be understood that the liquor which is supplied to the feeds is only heated enough to maintain it in a liquid condition and at as low a temperature as possible for this purpose, so that the heat to be abstracted, in addition to the latent heat of fusion, may be as low as possible. This provides a quick solidification upon the drum surface and a higher efficiency.

The invention above described provides a means for increasing the flake thickness above that obtainable by known methods. Flakes of increased thickness are desirable in the cases of materials which otherwise give flakes that are so thin that they become excessively friable.

Figure 4:
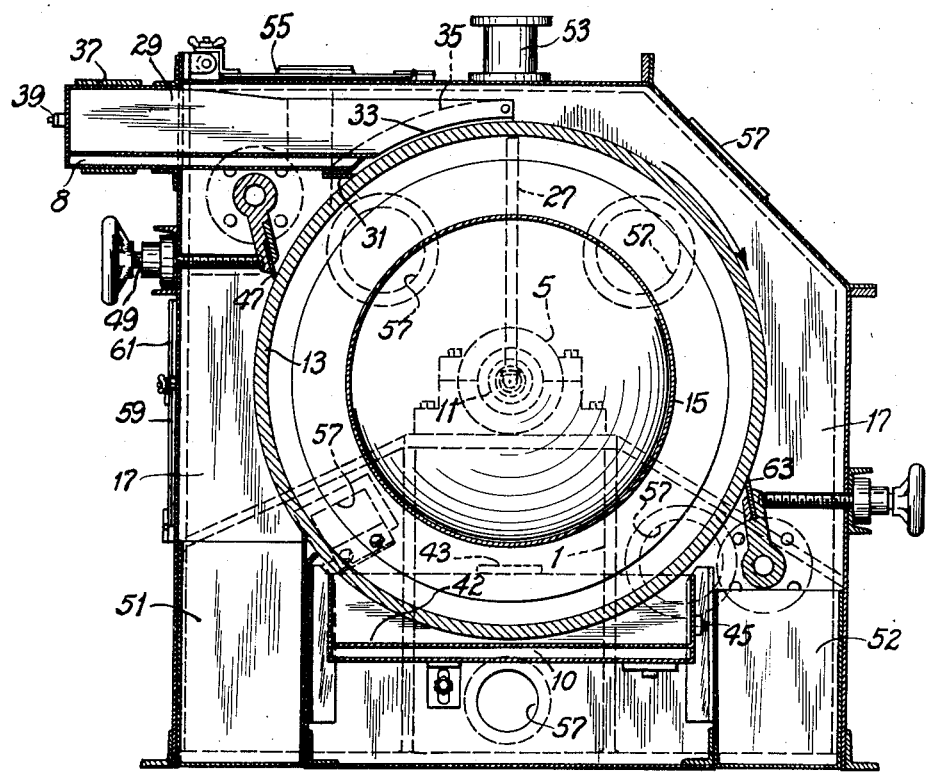
Fig. 4 is a view similar to Fig. 2 showing a modified form of the invention; and, Fig. 5 is an oblique section taken on line 5—5 of Fig. 2.

In Fig. 4 is shown a modification of the invention in which, although only a usual type of flake is obtained, the advantage of dual capacity on one cooling drum is obtained. In the description of this form like numerals designate like parts. Instead of having a single scraper 47, another scraper 63 is used between the upper pan 29 and the lower pan 41. This scraper 63 serves to scrape off the first layer applied to the drum; then the drum proceeds through a lower pan 42 and picks up another layer, and this second layer is then scraped off by the said scraper 47. A second box 52 is provided for receiving and carrying off flakes from the scraper 63.

Figure 3:
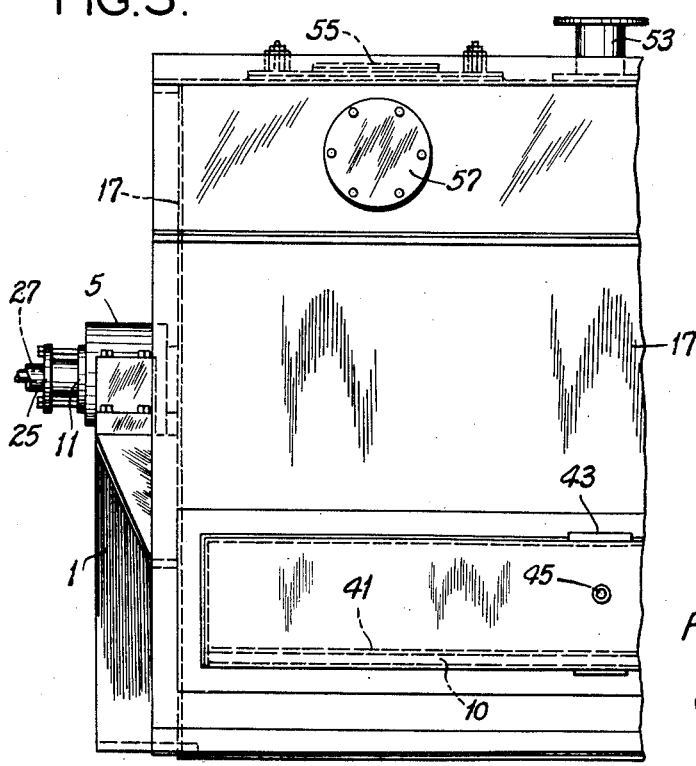
Fig. 3 is a fragmentary view of the apparatus taken from the right of Fig. 2.
Figure 5:
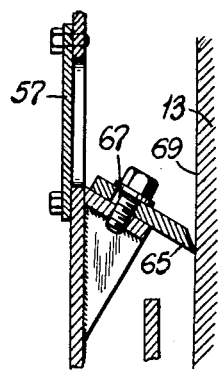

In Fig. 5 is shown an end view of the drum 13 and an auxiliary scraper 65 which is adjustably mounted as indicated at 67 to scrape material from the end 69 of the drum 13. One of these scrapers is at each end of the drum 13. The immersed ends 69 are of annular form so that the blade 65 can scrape substantially the entire immersed end surfaces. The scraper returns the material to the lower pan (41 in Figs. 1–3; 42 in Fig. 4) by reason of the fact that this pan extends beyond the ends of the drum 13 as at 2 (see Fig. 1). Here these flakes return to liquid form.

In view of the above it will be seen that the several objects of the invention are achieved and other advantageous results attained.

As many changes could be made in carrying out the above constructions and processes without departing from the scope of the invention, it is intended that all matter contained in the above description or shown in the accompanying drawings shall be interpreted as illustrative and not in a limiting sense.

I claim:

1. A flaker comprising a rotating drum, means for cooling said drum as it rotates, means for applying liquor to said drum at one region as the drum rotates, said liquor becoming solidified by cooling, and means for applying a second layer of liquor over said first layer on said drum at a point spaced from the region of said first application, said second layer also solidifying, and means for simultaneously flaking both layers from the drum, the peripheral distance between the points of application being such that the first layer has substantially solidified before application and solidification of the second layer, said layers being integrated and together forming single flakes.

2. A flaker comprising a moving member, means for cooling said member as it moves, means for applying liquor to said member at one region as it moves, said liquor becoming solidified by cooling, and means for applying a second layer of liquor over said first layer on said member at a point spaced from the first application so that the first layer has substantially solidified, said second layer also solidifying and integrating with the first layer, and means for simultaneously flaking both layers from the moving member.

3. A flaker comprising a rotating cooling drum, a weir-feed pan near the top of the drum carrying liquor which is applied to said drum, a dip-feed pan below the said drum carrying liquor into which said drum dips, the distance between said pans being such that substantial solidification of material occurs between pans, and a scraper located between said pans at a region on the drum where it travels from the lower pan to the upper pan the distance between the dip-feed pan and the scraper being such as to permit substantial solidification of the material picked up from the dip-feed pan.

4. A flaker comprising a rotating cooling member, a weir-feed pan at one region of the member carrying liquor which is applied to said member, a dip-feed pan at another region of the member carrying liquor into which said member dips, the distance between said pans being such that substantial solidification of material occurs between pans, and a scraper located between said pans at a region on the member where it travels from the dip-feed pan to the weir pan the distance between the dip-feed pan and the scraper being such as to permit substantial solidification of the material picked up from the dip-feed pan.

5. A flaker comprising a rotating drum, means for cooling the drum, a weir-feed pan near the top of the drum carrying liquor which is applied to said drum, a dip-feed pan below the said drum carrying liquor into which said drum dips, the distance between said pans being such that substantial solidification of material occurs between pans, and a scraper located between said pans at a region on the drum where it travels from the lower pan to the upper pan, said scraper being located near said upper pan the distance between the dip-feed pan and the scraper being such as to permit substantial solidification of the material picked up from the dip-feed pan.

6. A flaker comprising a rotating cooling member, a liquor feeder on one side of the cooling member and carrying liquor which is applied to said cooling member, another liquor feeder on another side of said cooling member carrying liquor which is applied to said cooling member, the distance between said feeders being such as to permit solidification of the layer applied by the first feeder before the second feeder applies its layer and a scraper located between said feeders at a region on the cooling member where it travels from one feeder to the other, the distance between the scraper and the second-named feeder permitting solidification of the second layer on the first layer.

FRANK R. MURPHY.